Patented Nov. 27, 1951

2,576,839

UNITED STATES PATENT OFFICE 2,576,839

POLYMERIZATION OF ALKYLOLAMIDES OF THE ACRYLIC ACID SERIES

Giffin D. Jones, Easton, Pa., assignor to General Aniline & Film Corporation, New York, N. Y., a corporation of Delaware No Drawing. Application October 16, 1945,
Serial No. 622,706

4 Claims. (Cl. 260—89.7)

This invention relates to the polymerization of amides of acids of the acrylic acid series and the resulting polymers. More particularly, the invention relates to the polymerization of monomers of N-disubstituted amides of $\alpha$-substituted acrylic acids in which at least one of the N-substituents is an alkylol group.

N-dialkyl $\alpha$-substituted acrylamides do not polymerize under ordinary conditions of light, heat, or peroxide catalysis. I have also found this to be so where one of the N-substituents is an alkylol group. As pointed out in U. S. Patent 2,311,548, granted to Jacobson et al., in order to polymerize acrylic acid amides which are substituted in the $\alpha$-position, it is necessary that the amide must have one hydrogen atom on the nitrogen. While N-dialkylmethacrylamides as, for example, N-diethylmethacrylamide, may be interpolymerized with methylmethacrylate, the N-dialkylamides alone have not heretofore been successfully polymerized.

It is accordingly among the objects of my invention to provide a highly effective process for polymerizing N-disubstituted $\alpha$-substituted acrylamides in which at least one of N-substituents is an alkylol group. Polymers which possess the property of gelling in aqueous solution and which are highly satisfactory as a substitute for gelatin may be obtained.

A more particular object of my invention is to provide a method for polymerizing an N-alkyl-N-alkylol-$\alpha$-substituted acrylamide, such as for example, N-methyl-N-$\beta$-ethanolmethacrylamide.

According to my invention, the above objects are accomplished by subjecting an N-disubstituted $\alpha$-substituted acrylamide in which at least one of the N-substituents is an alkylol group to polymerization in a strongly acidic solution. Particularly found effective is an aqueous solution of a strong inorganic acid, as for example, sulfuric acid. Any suitable catalyst, or ultra-violet light may be utilized to facilitate the polymerization. For this purpose, oxygen-containing catalysts such as, for example, potassium persulfate (i. e., peroxide catalysts) have been found to be highly effective.

The following attempts were made to polymerize N-methyl-N-$\beta$-ethanolmethacrylamide by conventional methods:

a. 25 parts of the monomer were dissolved in 100 parts of water and subjected to ultra-violet light while a stream of nitrogen was bubbled through the solution. After a week, there was no polymerization. 0.1 part of benzoyl peroxide was added to the solution and the solution heated to 100° C. After a week of such treatment, there was still no polymerization.

b. The monomer was sealed in an evacuated tube and subjected to ultra-violet light. After two weeks of such treatment, no polymerization occurred.

c. A portion of the monomer was distilled at 0.5 mm. pressure and subjected to ultra-violet light. After a month, no polymerization had occurred.

d. 5 parts of the monomer were sealed in an evacuated tube containing 0.05 part of benzoyl peroxide and subjected to ultra-violet light. The material became yellow but had not polymerized after three weeks.

e. 1.23 parts of the monomer were dissolved in 10 parts of water, treated with 0.5 part of glacial acetic acid and 0.1 part of benzoyl peroxide and then heated under a current of hydrogen at 100° C. No polymer had formed after a week.

However, following the procedure of my invention, N-disubstituted $\alpha$-substituted acrylamides in which at least one of the N-substituents is an alkylol group are readily polymerized, as illustrated, by the following examples in which the parts are by weight unless otherwise indicated.

*Example 1*

A 20% aqueous solution of N-methyl-N-$\beta$-ethanolmethacrylamide was acidified with 10% sulfuric acid and treated with 1% of potassium persulfate. It was subjected to a temperature of about 100° C. for about a week after which a gel had formed. A solid polymer was obtained by washing the gel with an aqueous acid as, for example, a dilute solution of sulfuric or acetic acid.

*Example 2*

The procedure of Example 1 was carried out on N-methyl-N-propanol-2-methacrylamide. A solid, water-insoluble polymer was obtained.

*Example 3*

The procedure of Example 1 was applied to N-diethanolmethacrylamide. The polymer obtained was insoluble in water.

In a manner similar to that described in the above examples, other monomers of N-disubstituted $\alpha$-substituted acrylamides in which at least one of the N-substituents is an alkylol group may be polymerized. My process is applicable generally to the polymerization of compounds which may be represented by the following general formula:

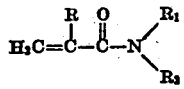

wherein R is alkyl, such as methyl, ethyl, propyl, isopropyl, isobutyl, butyl; aryl, such as phenyl; cycloparaffin, such as cyclohexyl; aralkyl, such as benzyl. $R_1$ is alkylol, such as

etc., and $R_2$ is alkyl, such as methyl, ethyl, propyl, butyl, etc.; alkylol, such as

cycloaliphatic, such as cyclohexyl; aryl such as phenyl; or aralkyl, such as benzyl.

Strong inorganic acid solutions for the polymerization medium are preferred. The use of a weakly acidic polymerization medium was found to be ineffective to produce satisfactory polymerization or failed to produce polymerization at all, as see test (e) above. In addition to sulfuric acid, there may be utilized phosphoric or hydrochloric acid. The acids desirably are employed in an equivalent amount with the monomer.

In addition to potassium persulfate, other peroxide catalysts and ultra-violet light may be employed to facilitate polymerization. As examples of other peroxide catalysts are mentioned benzoyl peroxide or per-acetic acid. Any suitable temperature may be used to carry out the polymerization. Room temperature or below or higher temperatures as for example, 100° have been found to be satisfactory. Heat facilitates the polymerization reaction.

Monomeric N-methyl-N-ethanolmethacrylamide may be prepared by reacting one mol of methacryl chloride with two mols of N-methylethanolamine in the presence of acetonitrile. N-methylethanolamine hydrogen chloride precipitates and the solution of N-methyl-N-ethanolmethacrylamide is separated therefrom by filtration. The monomer is then recovered by distillation. The process of preparing the monomer forms the subject matter of my copending application Serial No. 622,702, filed October 16, 1945.

In a similar manner (a) N-methyl-N-propanol-2-methacrylamide and (b) N-diethanolmethacrylamide can be prepared, utilizing in the case of (a) N-methyl-N-propanol-2 amine, and in the case of (b) diethanolamine instead of N-methylethanolamine.

I claim:

1. A method of polymerizing N-methyl-N-ethanolmethacrylamide, which consists in treating the monomer in a strongly acidic approximately 10% aqueous solution of sulfuric acid, with potassium persulfate.

2. A method of polymerizing N-methyl-N-propanol-2-methacrylamide, which consists in treating the monomer in a strongly acidic approximately 10% aqueous solution of sulfuric acid, with potassium persulfate.

3. A method of polymerizing N-diethanolmethacrylamide, which consists in treating the monomer in a strongly acidic approximately 10% aqueous solution of sulfuric acid, with potassium persulfate.

4. A method of polymerizing an N-disubstituted α-substituted acrylamide of the formula

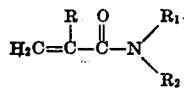

wherein R represents a radical selected from the group consisting of alkyl, aryl, cycloaliphatic and aralkyl radicals; $R_1$ represents alkylol; and $R_2$ represents a radical selected from the group consisting of alkyl, alkylol, cycloaliphatic, aryl and aralkyl radicals; which consists in treating the monomer with a peroxide polymerization catalyst, in a strongly acidic aqueous solution of an inorganic acid selected from the group consisting of sulfuric, phosphoric and hydrochloric acids, the acidity of said solution being of the order of that of approximately 10% aqueous sulfuric acid.

GIFFIN D. JONES.

REFERENCES CITED

The following references are of record in the file of this patent:

UNITED STATES PATENTS

| Number | Name | Date |
|---|---|---|
| 2,017,537 | Hoffmann et al. | Oct. 15, 1935 |
| 2,129,662 | Barrett et al. | Sept. 13, 1938 |
| 2,311,548 | Jacobson et al. | Feb. 16, 1943 |

FOREIGN PATENTS

| Number | Country | Date |
|---|---|---|
| 447,750 | Belgium | Nov. 30, 1942 |

OTHER REFERENCES

Abstract in "Chem. Abstracts," vol. 39, p. 1000.